United States Patent [19]

Zerdian et al.

[11] Patent Number: 4,469,237
[45] Date of Patent: Sep. 4, 1984

[54] SPRING LID LIFTER PRESSURE COOKER

[76] Inventors: James Zerdian, C/O George Spector 3615 Woolworth Bldg. 233 Broadway; George Spector, 3615 Woolworth Bldg., 233 Broadway, both of New York, N.Y. 10007

[21] Appl. No.: 536,535

[22] Filed: Sep. 28, 1983

[51] Int. Cl.³ .................................................. B65D 51/16
[52] U.S. Cl. ................................... 220/209; 220/256; 220/366; 220/203
[58] Field of Search .............. 220/203, 208, 209, 298, 220/303, 304, 288, 316, 366, 256

[56] References Cited

U.S. PATENT DOCUMENTS 3,768,706 10/1973 Hill ....................................... 220/256
4,276,990 7/1981 Chiodo ................................ 220/209
4,330,069 5/1982 Bauer .................................. 220/203

Primary Examiner—George T. Hall

[57] ABSTRACT

A pressure cooker is provided and consists of a container having an external threaded peripheral rim, a gasket affixed to the rim of the container, a pressure plate that sits upon the gasket covering the rim of the container, a cover for the container having an internal threaded peripheral flange, the cover having a plurality of lateral through openings on the flange, a compression seal providing a seal between the cover and the pressure plate the compression seal and pressure plate effectively sealing the lateral through openings when the cover is threaded onto the container, the seal comprising a compressionable material compressing up against the cover when vapor pressure in the container exceeds a predetermined pressure causing the pressure plate to rise up and uncover the lateral through openings and vent the container vapor outwardly when the seal has compressed sufficiently up against the cover when the vapor pressure exceeds the predetermined pressure and the seal material having memory and restoring downwardly causing the pressure plate to lower down to a position sealing the lateral through openings when the vapor pressure in the container is less than the predetermined pressure.

3 Claims, 6 Drawing Figures

SPRING LID LIFTER PRESSURE COOKER

BACKGROUND OF THE INVENTION

The instant invention relates generally to containers that are subjected to varying internal pressures and more specifically it relates to a pressure cooker that is used in the home to prepare foods for the table.

Pressure cookers are vessels that contain water and food. A sealed fluid tight cover is placed over the vessel and has a release valve. At times this release valve can malfunction causing an explosion to the pressure cooker when the pressure builds up too high. This situation is dangerous so accordingly it is in need of an improvement.

SUMMARY OF THE INVENTION

A principle object of the present invention is to provide a pressure cooker that contains an improved way to release internal vapor pressure safely.

Another object is to provide a pressure cooker that vents faster when the internal vapor pressure builds up in the pressure cooker.

An additional object is to provide a pressure cooker that has a window built into it to allow a person to look into the pressure cooker.

A further object is to provide a pressure cooker that is simple and easy to use.

A still further object is to provide a pressure cooker that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
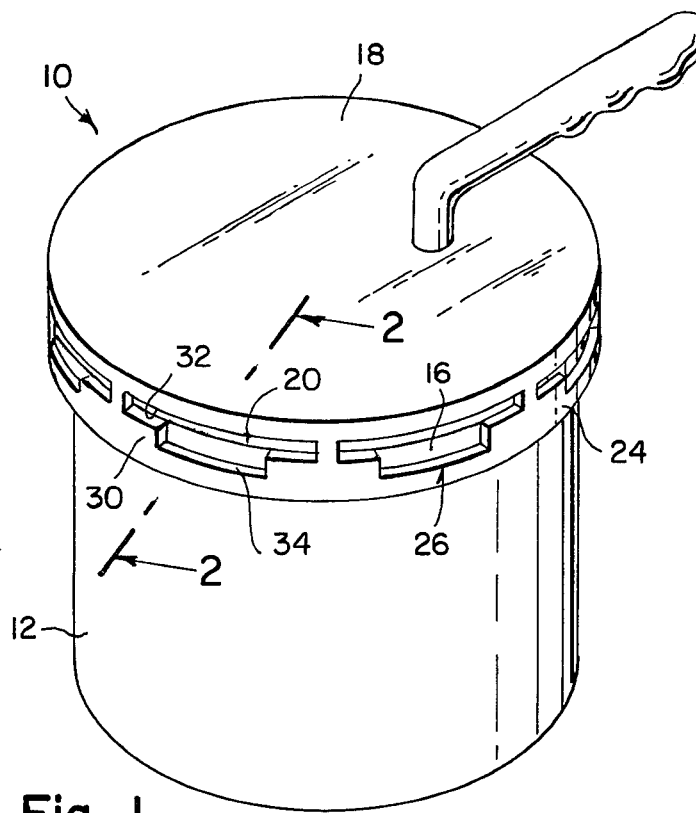
FIG. 1 is a perspective view of the invention.
Figure 5:
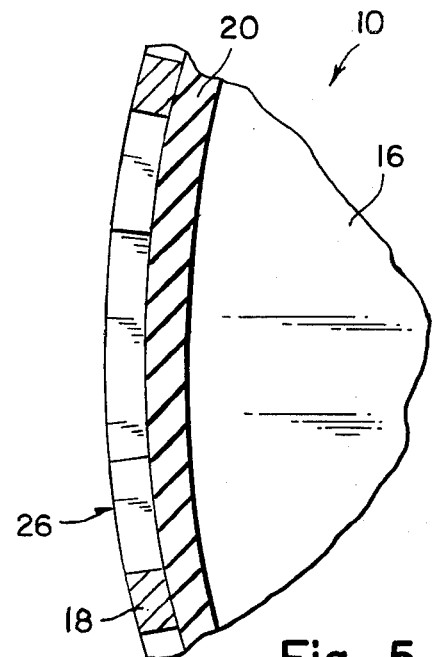
FIG. 5 is a cross sectional view taken along line 5—5 in FIG. 2.
Figure 2:
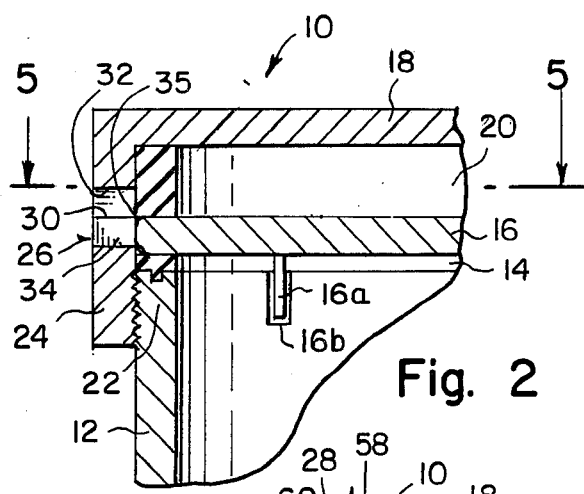
FIG. 2 is a cross sectional view taken along line 2—2 in FIG. 1.

Turning now descriptively to the drawings, in which similar reference characters denote similar elements throughout the several views, FIGS. 1 through 5 illustrates a pressure cooker 10. The pressure cooker 10 basically consists of a container 12, a gasket 14, a pressure plate 16, a cover 18 and a compression seal 20.

The container 12 has an external threaded peripheral rim 22 with the gasket 14 affixed to the rim 22 of the container 12. The pressure plate 16 sits upon the gasket 14 covering the rim 22 of the container 12. The cover 18 for the container 12 has an internal threaded peripheral flange 24 containing a plurality of lateral through openings 26 (see FIG. 1). Sufficient threads are provided for sealing.

The compression seal 20 provides a seal between the cover 18 and the pressure plate 16. The compression seal 20 and pressure plate 16 effectively seal the lateral through openings 26 when the cover 18 is threaded onto the container (see FIG. 2). A detent 16a on plate 16 slides in slot 16b in the container preventing plate rotation.

Figure 3:
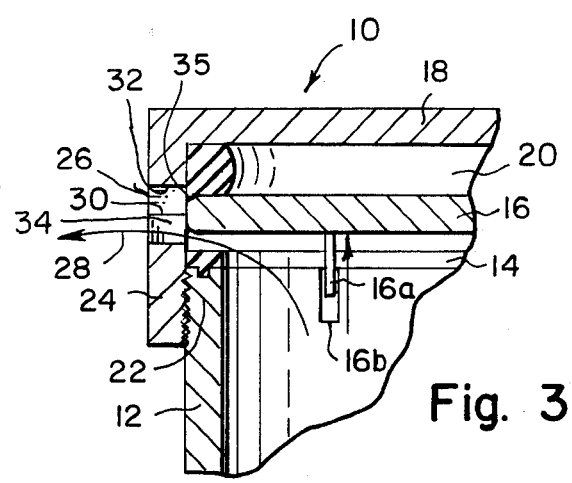
FIG. 3 is a cross sectional view similar to FIG. 2 showing pressure plate in a raised position.

The seal 20 comprises compressionable material compressing up against the cover 18 when vapor pressure in the container 12 exceeds a predetermined pressure causing the pressure plate 16 to rise up and uncover the lateral through openings 26 and vent the container vapor 28 outwardly when the seal 20 has compressed sufficiently up against the cover 18 when the vapor pressure exceeds the predetermined pressure (see FIG. 3).

Figure 4:
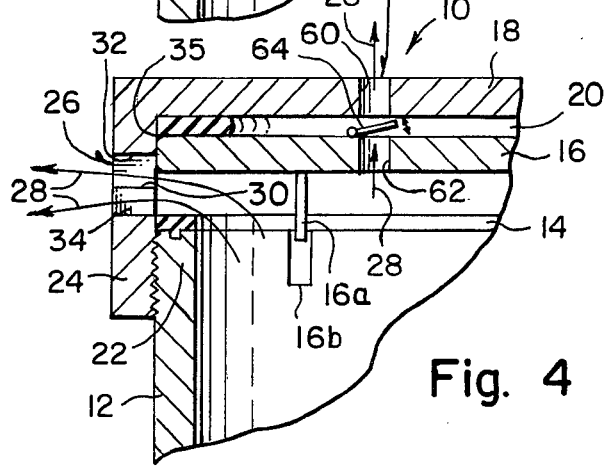
FIG. 4 is a cross sectional view similar to FIG. 2 showing pressure plate in a still further raised position.

Each of the lateral through openings 26 on the flange 24 of the cover 18 is stepped at 30 having a top opening 32 larger than a bottom opening 34 allowing the container 12 to vent the container vapor 28 faster when vapor pressure builds up in the container 12 causing the pressure plate 16 to rise up higher (see FIG. 4). The pressure plate 16 has rounded corners 35 to prevent the pressure plate 16 from getting caught in the lateral through openings 26.

Figure 6:
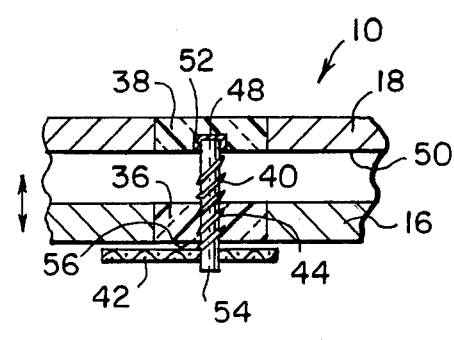
FIG. 6 is a cross sectional view of a modification showing a window.

FIG. 6 shows the pressure cooker 10 further comprising a first window 36, a second window 38, a spiral grooved shaft 40 and a screen 42.

The first window 36 has a spiral grooved aperture 44 therethrough. The first window 36 is mounted within the pressure plate 16.

The second window 38 has a recess 48 in its bottom surface 50. The second window 38 is mounted within the cover 18 in a locality directly above the first window 36.

The spiral grooved shaft 40 is rotatably affixed at 52 within the recess 48 of the second window 38 and downwardly threaded through the spiral grooved aperture 44 in the first window 36.

The screen 42 is affixed transverse off center to end 54 of the spiral grooved shaft 40 below the second window 36. The screen 42 prevents steam build up on bottom surface 56 of the second window 36 from vapor within the container 12 until the vapor pressure causes the pressure plate 16 to rise up rotating the spiral grooved shaft 40 via the spiral grooved aperture 44 in the first window 36 turning the screen 42 away from the first window 36 allowing a person (not shown) to look through the second window 38 and the first window 36 into the container 12.

An emergency pressure relief valve 58 as shown in FIG. 4 can be provided. The relief valve 58 consists of a vent hole 60 placed in the cover 18, a vent hole 62 placed in the pressure plate 16 and a spring loaded release valve 64. If vapor pressure builds up within the container 12 the spring loaded release valve 64 will open allowing the container vapor 28 to vent through holes 60 and 62.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A pressure cooker which comprises:
   (a) a container having an external threaded peripheral rim;
   (b) a gasket affixed to the rim of the container;
   (c) a pressure plate that sits upon the gasket covering the rim of the container;
   (d) a cover for the container having an internal threaded peripheral flange, the cover having a plurality of lateral through openings on the flange;
   (e) a compression seal providing a seal between the cover and the pressure plate the compression seal and pressure plate effectively sealing the lateral through openings when the cover is threaded onto the container, the seal comprising a compressionable material compressing up against the cover when vapor pressure in the container exceeds a predetermined pressure causing the pressure plate to rise up and uncover the lateral through openings and vent the container vapor outwardly when the seal has compressed sufficiently up against the cover when the vapor pressure exceeds the predetermined pressure and the seal material having memory and restoring downwardly causing the pressure plate to lower down to a position sealing the lateral through openings when the vapor pressure in the container is less than the predetermined pressure.

2. A pressure cooker as recited in claim 1, wherein each of the lateral through openings on the flange of the cover is stepped having a top opening larger than a bottom opening allowing the container to vent the container vapor faster when vapor pressure builds up in the container causing the pressure plate to rise up higher.

3. A pressure cooker as recited in claim 2, that further comprises:
   (a) a first window having a threaded aperture therethrough, the first window mounted within the pressure plate;
   (b) a second window having a recess in bottom surface, the second window mounted within the cover in a locality directly above the first window;
   (c) a threaded shaft rotatably affixed within the recess of the second window and downwardly threaded through the threaded aperture in the first window; and
   (d) a screen affixed transverse off center to end of the threaded shaft below the second window, the screen prevents steam build up on bottom surface of the second window from vapor within the container until the vapor pressure causes the pressure plate to rise up rotating the threaded shaft via the threaded aperture in the first window turning the screen away from the first window allowing a person to look through the second window and the first window into the container.

* * * * *